United States Patent [19]

Husbands

[11] Patent Number: 4,571,024

[45] Date of Patent: Feb. 18, 1986

[54] WAVELENGTH SELECTIVE DEMULTIPLEXER TUNER

[75] Inventor: Charles R. Husbands, Acton, Mass.

[73] Assignee: The United States of America as represented by the Secretary of the Air Force, Washington, D.C.

[21] Appl. No.: 545,307

[22] Filed: Oct. 25, 1983

[51] Int. Cl.[4] ............................ G02F 1/03; H04J 1/02
[52] U.S. Cl. ............................ 350/96.19; 350/96.16; 370/1
[58] Field of Search ............... 350/96.13, 96.14, 96.15, 350/96.16, 96.18, 96.19, 162.24; 370/1, 3

[56] References Cited

U.S. PATENT DOCUMENTS

| | | | |
|---|---|---|---|
| 3,909,114 | 9/1975 | Haas et al. | 350/162.24 X |
| 3,923,373 | 12/1975 | Dabby et al. | 350/96 WG |
| 4,143,941 | 3/1979 | Soref | 350/96.16 |
| 4,145,109 | 3/1979 | Nelson | 350/96.14 |
| 4,148,556 | 4/1979 | Sauter et al. | 350/96.13 |
| 4,157,860 | 6/1979 | Marcatili | 350/96.14 |
| 4,172,630 | 10/1979 | Burns et al. | 350/96.14 |
| 4,175,827 | 11/1979 | McMahon | 350/96.14 |
| 4,182,544 | 1/1980 | McMahon | 350/96.16 |
| 4,182,935 | 1/1980 | Chown | 179/15 AL |
| 4,208,094 | 6/1980 | Tomlinson et al. | 350/96.20 |
| 4,212,513 | 7/1980 | Gravel | 350/96.15 |
| 4,243,297 | 1/1981 | Elion | 350/96.15 |
| 4,253,728 | 3/1981 | Venkatesan | 350/96.15 |
| 4,274,706 | 6/1981 | Tangonan | 350/96.19 |
| 4,283,113 | 8/1981 | Eden | 350/96.15 |
| 4,294,508 | 10/1981 | Husbands | 350/96.15 |
| 4,335,933 | 6/1982 | Palmer | 350/96.19 |
| 4,343,532 | 8/1982 | Palmer | 350/96.19 |

FOREIGN PATENT DOCUMENTS 56-60401 5/1981 Japan ................. 350/96.19
57-211104 12/1982 Japan ................. 350/96.15

OTHER PUBLICATIONS

Tomlinson, W. J., et al., "Optical Multiplexer for Multimode Fiber Transmission Systems," *Applied Physics Letters*, vol. 31, No. 3, Aug. 1, 1977, pp. 169–171.
"Optical Wavelength-Division Multiplexer for the 1–1.4 μm Spectral Region," *Electronics Letters*, vol. 14, No. 11, May 25, 1978, pp. 345–347, Tomlinson et al.

*Primary Examiner*—John Lee
*Attorney, Agent, or Firm*—Donald J. Singer; Jacob N. Erlich

[57] ABSTRACT

A wavelength selective demultiplexer tuner having an optically transmissive body for receiving an input signal containing a plurality of different wavelengths and transmitting the signal therethrough. An electro-optic block of material is secured to the body of the tuner and a reflective grating or mirror is secured to the electro-optic block of material for redirecting through the body the input signal as a plurality of signals, each containing a different one of the wavelengths. By appropriately varying a voltage placed across the electro-optic block of material, the index of refraction of the block of material changes thereby altering the optical paths followed by the plurality of signals redirected through the body. In this manner, each of the signals containing a different one of the wavelengths can be selectively output from the body at different times and at the same, single location.

8 Claims, 3 Drawing Figures

WAVELENGTH SELECTIVE DEMULTIPLEXER TUNER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical demultiplexers, and, more particularly, to a wavelength selective optical demultiplexer tuner where a predetermined wavelength is extracted or tuned from an input signal containing a plurality of wavelengths and this predetermined wavelength is received at a single preselected point on the demultiplexer tuner.

In practice, the need frequently arises for communications or reconnaissance systems which simultaneously convey multiple messages for a large number of information sources in one location to a large number of users at another location. Multiplexing systems economically meet this need by combining the messages from several information sources, which are then transmitted as a composite group over a single transmission facility, with a provision at the receiver for separation (demultiplexing) back to individual messages.

In recent years with the development and implementation of fiber optic technology into practical transmission systems a great deal of attention has been given to a multiple carrier technique referred to as wavelength division multiplexing (WDM). This technique, which is the optical equivalent of the frequency division multiplexing technique employed in RF coaxial transmission networks, can be used to increase the information transfer capacity of the medium. In the wavelength division multiplexing technique each discrete data channel is modulated onto an optical carrier of a fixed wavelength. Each of the individual carriers are then superimposed onto the optical transmission medium. At the optical receiver the individual carrier must be reestablished by filtering the composite carrier into its individual wavelength components.

Generally, when this composite wavelength multiplexed signal is received by the demultiplexer, a number of techniques have been developed which separate each of the multiplexed signals into a plurality of outputs and receive, from the demultiplexer at a plurality of separated points, each of the separated previously multiplexed signals. An example of such a prior optical demultiplexer can be found in U.S. Pat. No. 4,294,508 issued on Oct. 13, 1981 to this inventor. Another such demultiplexing technique involves the use of a Graded Index (GRIN) rod having a blazed grating associated with one end thereof. In such a technique, as illustrated, for example, in the following articles by Tomlinson et al entitled "Optical multiplexer for multimode fiber transmission systems" *Applied Physics Letters,* Vol. 31. No. 3, Aug. 1, 1977, pgs. 169–171, and "Optical wavelength-division multiplexer for the 1–1.4 μm spectral region," *Electronics Letters,* Vol. 14, May 25, 1978, No. 11, pgs. 345–347, the input composite wavelength multiplexed signal has each of its individual wavelengths diffracted at a slightly different angle by the grating and appear as a series of displaced positions along a face of the GRIN rod. In such a technique, it can be seen that the demultiplexer acts as a series of bandpass filters, narrow-banding the optical input signal to a plurality of displaced positions.

One of the inherent problems associated with such systems is the physical placement of the output optical fibers on the front face of the demultiplexer. It is the physical placement of the optical receiving fibers which determine what wavelength is to be observed. As it is most difficult to procure lasers with unique wavelengths, the laser's wavelength must be carefully selected and perhaps thermally tuned to place it within the bandpass of the established demultiplexer channel. Furthermore, in many applications, such as local area networks and TV distribution systems, it is not necessary to extract all the wavelengths on the composite optical carrier simultaneously. Therefore, the utilization of such prior demultiplexing techniques as described above tend to be inherently inefficient and generally unacceptable for single wavelength demultiplexing applications.

SUMMARY OF THE INVENTION

The present invention overcomes the problem set forth hereinabove by providing a wavelength selective demultiplexer tuner which permits the selection of a unique or single wavelength from a composite wavelength multiplexed signal at a single preselected location on the output end of the demultiplexer tuner.

The wavelength selective demultiplexer tuner of the present invention incorporates therein a Graded Index (GRIN) rod which receives at the front surface thereof a wavelength division multiplexed signal and for outputting at a single location each of a plurality of signals containing the wavelengths making up the original multiplexed signal. The rear surface of the Graded Index rod has a wedge of electro-optic material secured thereto, with this material being of the type capable of having its index of refraction varied with the application of an electric voltage. A material such as lithium niobate would be acceptable in the present invention.

Positioned on the external surface of the electro-optic wedge of material is a grating which is capable of reflecting the incoming multiplexed signal back through the electro-optic material and through the GRIN rod for output as a single wavelength signal at a single location on the front surface of the rod. In addition, opposed surfaces of the electro-optic wedge have electrodes deposited thereon so as to operably connect thereto a variable voltage source in order to vary the voltage across the electro-optic material. By varying the voltage across the electro-optic material the index of refraction of the electro-optic material can be varied. If the electro-optic material utilized with the present invention is capable of producing a large enough variation in the index of refraction with the applied voltage employed, all of the wavelengths in the composite carrier signal can be examined on a selective basis at a single output point on the front surface of the GRIN rod. Further, it may be possible under certain conditions if the refractive index of the electro-optic wedge can be changed significantly, sufficient wavelength separation could be obtained without the use of the grating and instead the back surface of the electro-optic material would be mirrored thereby substantially reducing losses incurred due to grating inefficiency.

It is therefore an object of this invention to provide a wavelength selective demultiplexer tuner which is capable of individually outputting a plurality of individual wavelengths at a single preselected location on the demultiplexer tuner.

It is another object of this invention to provide a wavelength selective demultiplexer tuner which can be easily adjusted so as to provide the output of only a single wavelength.

It is still a further object of this invention to provide a wavelength selective demultiplexer tuner which is highly reliable in operation and substantially eliminates the use of electro-mechanical elements for wavelength separation.

It is even a further object of this invention to provide a wavelength selective demultiplexer tuner which is economical to produce and which utilizes conventional, currently available components that lend themselves to standard, mass producing manufacturing techniques.

For a better understanding of the present invention, together with other and further objects thereof, reference is made to the following description taken in conjunction with the accompanying drawings and its scope will be pointed out in the apended claims.

DETAILED DESCRIPTION OF THE DRAWING

DETAILED DESCRIPTION OF THE PREFERRED EMBODIMENT

Figure 1:
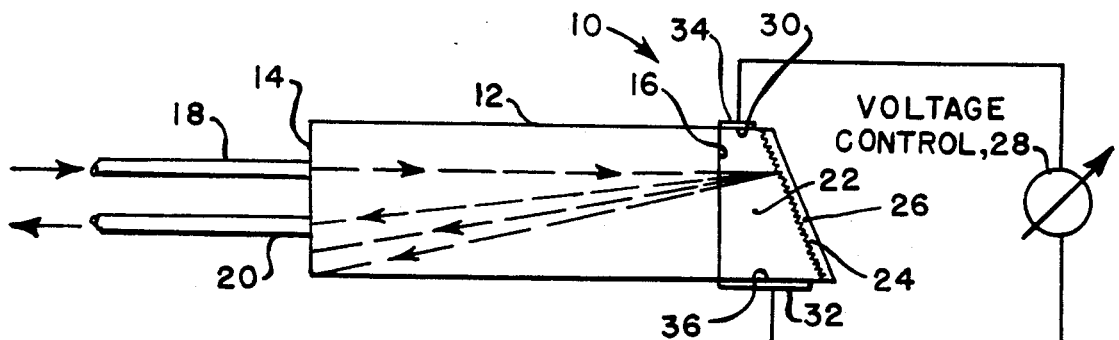
FIG. 1 is a schematic representation of the wavelength selective demultiplexer tuner of the present invention.

Reference is now made to FIG. 1 of the drawing which clearly illustrates the components making up the wavelength selective demultiplexer tuner 10 of the present invention. Tuner 10 includes a Graded Index (GRIN) rod 12; that is, a glass rod of up to 5 mm in diameter having a refractive index profile which varies as a function of distance from the rod's center. The GRIN rod 12 is a ¼ pitch in length so that a 50 micron beam applied on the input or front surface of face 14 is expanded when observed on the rear face 16.

Affixed to the input face 14 is any suitable optical fiber 18 carrying a composite optical signal made of a plurality of wavelengths, of for example $\lambda_1$, $\lambda_2$, and $\lambda_3$. Optical fiber 18 is affixed to the input surface 14 of GRIN rod 12 by any suitable optical coupling means. Another optical fiber 20 is also affixed to the input surface 14 of GRIN rod 12 but this optical fiber 20 acts as the output fiber of tuner 10 of the present invention. Optical fiber 20 receives therethrough a single tuner signal of one of the plurality of input wavelengths (either $\lambda_1$, $\lambda_2$, or $\lambda_3$). The manner in which this particular single wavelength optical signal is output from the wavelength selective demultiplexer tuner 10 of the present invention will be set forth in greater detail hereinbelow.

Continuing with the description of the components making up the wavelength selective demultiplexer tuner 10 of this invention is an electro-optic wedge of material 22 which is affixed by any suitable transparent adhesive to the outer or rear surface 16 of GRIN rod 12. Although any suitable type of electro-optic material may be used with the present invention, it is preferable that the electro-optic material 22 be of a type which is capable of providing large variations in the index of refraction thereof when a voltage is applied thereacross. A suitable material which would be acceptable with the present invention would be lithium niobate.

The exterior wedged surface 24 of wedge-shaped material 22 has a grating 26 affixed thereto. Grating 26 is capable of reflecting the input optical signals therefrom, back in the direction of surface 14. Grating 26 does so in a manner in which each of the plurality of input wavelengths, $\lambda_1$, $\lambda_2$ and $\lambda_3$, for example, are spatially separated as denoted by the phantom lines in FIG. 1 of the drawing. Any suitable controllable voltage source 28 is electrically connected to opposed end surfaces 30 and 32 of wedge-shaped electro-optic material 22 by means of a pair of electrodes 34 and 36 secured thereto, respectively. By varying the voltage across the wedge-shaped electro-optic material 22 the index of refraction of the electro-optic material 22 varies. This procedure varies the angle at which the various wavelengths pass through GRIN rod 12.

Figure 2:
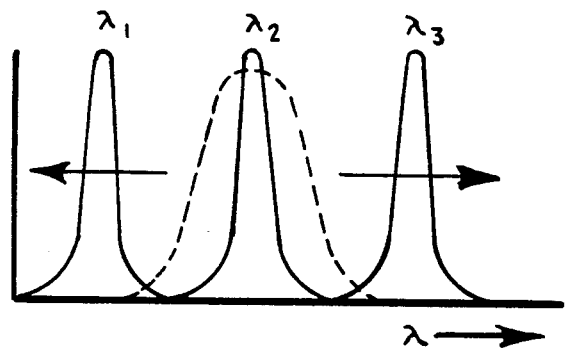
FIG. 2 is a graphic representation of the relationship between the selected wavelength output and the composite wavelength input.

As shown in FIG. 2 of the drawing, the demultiplexer tuner 10 of the present invention acts as a single narrow band filter which is capable of being moved across the spectrum of interest. In this manner the desirable wavelengths to be received from the demultiplexer 10 of the present invention (illustrated, for example, as wavelength $\lambda_2$ in FIG. 2 of the drawing) can be specifically output through optical fiber 20 by the appropriate control of the voltage source 28. By either increasing or decreasing the voltage across the wedge-shaped electro-optic material 22 as indicated in the graphic representation in FIG. 2 of the drawing either wavelength $\lambda_1$ or wavelength $\lambda_3$ can alternatively be output from optical fiber 20 in a "tuning-like" operation.

In the type of tuner 10 set forth with the present invention, the theoretical filter represented by the dotted lines in FIG. 2 of the drawing can be designed as narrow as possible as it will be tuned to optimize reception of the carrier signal of choice. Consequently, with the present invention there is only one input represented by optical fiber 18 and one output represented by optical fiber 20. By changing the index of refraction of the electro-optic material 22 by means of varying the voltage thereacross, the point of focus on the front surface 14 of the GRIN rod 12 can be changed. If an electro-optic material 22 providing a large enough variation in the index of refraction when the applied voltage is employed, all of the wavelengths in the composite carrier signal can be tuned or examined on a selective basis.

Figure 3:
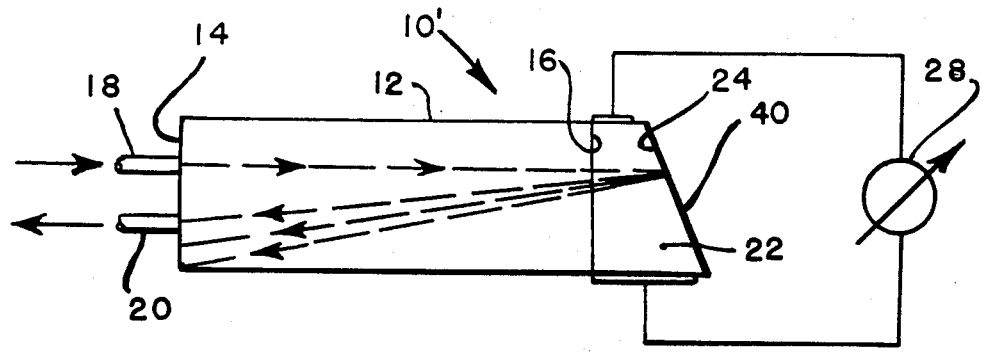
FIG. 3 is a schematic representation of an alternate embodiment of the wavelength selective demultiplexer tuner of the present invention.

In the embodiment shown in FIG. 3 of the drawing, the wavelength selective demultiplexer tuner is represented by the numeral 10' since the majority of the components making up the tuner 10' are identical to those making up tuner 10 referred to with respect to FIG. 1 of the drawing the same reference numerals referring to identical components will be used in both FIGS. 1 and 3 of the drawing. The major difference between the demultiplexer tuner 10' set forth in FIG. 3 and the demultiplexer 10 set forth in FIG. 1 of the drawing is that many of the losses associated with grating 26 can be eliminated by providing an electro-optic wedge material 22 which is capable of providing major changes in the refractive index thereof. Under such conditions the back surface 24 of the electro-optic wedge 22 can be mirrored in the manner depicted by element 40 in FIG. 3 of the drawing. In that manner the associated losses due to grating inefficiency can be eliminated. The operation of the demultiplexer tuner 10' set forth in FIG. 3 is otherwise identical to that set forth with respect to tuner 10 depicted in FIG. 1 of the drawing and a detailed description of its operation is therefore unnecessary.

Although this invention has been described with reference to particular embodiments, it will be understood by those skilled in the art that this invention is also capable of further and other embodiments within the spirit and scope of the appended claims.

I claim:

1. A wavelength selective demultiplexer tuner comprising:
    an optically transmissive body having a front surface and a rear surface, said front surface being capable of receiving at a first preselected location thereon an input signal containing a plurality of different wavelengths, and said body being made of a material capable of directing said input signal therethrough;
    means optically aligned adjacent said rear surface of said body for receiving said input signal after having passed through said body and for redirecting said input signal back through said body as a plurality of signals, each of said plurality of signals containing a different one of said wavelengths, respectively, and each of said signals following a different optical path through said body; and
    means operably associated with said plurality of signals for selectively changing said optical paths followed by said plurality of signals in order for each of said plurality of signals of said different wavelengths to be selectively output at different times from a same second preselected location on said body.

2. A wavelength selective demultiplexer tuner as defined in claim 1 wherein said means for selectively changing said optical paths of said plurality of signals comprises a solid block of electro-optic material secured to said rear surface of said body, a pair of electrodes secured to opposite sides of said block of material and means electrically connected to said electrodes for applying a controllable amount of voltage across said block of material whereby the refractive index of said block of material can be selectively varied.

3. A wavelength selective demultiplexer tuner as defined in claim 2 wherein said means for receiving said input signal and redirecting said input signal as a plurality of signals comprises a grating secured to said block of electro-optic material.

4. A wavelength selective demultiplexer tuner as defined in claim 1 wherein said second preselected location is located on said front surface of said body.

5. A wavelength selective demultiplexer tuner as defined in claim 1 further comprising a first optical fiber secured to said body at said first preselected location and a second optical fiber secured to said body at said second preselected location.

6. A wavelength selective demultiplexer tuner as defined in claim 5 wherein said second preselected location is located on said front surface of said body.

7. A wavelength selective demultiplexer tuner as defined in claim 6 wherein said means for selectively changing said optical paths of said plurality of signals comprises a solid block of electro-optic material secured to said rear surface of said body, a pair of electrodes secured to opposite sides of said block of material and means electrically connected to said electrodes for applying a controllable amount of voltage across said block of material whereby the refractive index of said block of material can be selectively varied.

8. A wavelength selective demultiplexer tuner as defined in claim 7 wherein said means for receiving said input signal and redirecting said input signal as a plurality of signals comprises a grating secured to said block of electro-optic material.

* * * * *